3,065,057
METHOD OF PREPARING CYANOGEN
Marcellus J. Geerts, Evanston, and Charles T. O'Malley, Chicago, Ill., assignors to The Pure Oil Company, Chicago, Ill., a corporation of Ohio
No Drawing. Filed Mar. 28, 1961, Ser. No. 98,742
12 Claims. (Cl. 23—151)

This invention relates to new and useful improvements in processes for preparation of cyanogen and more particularly to the production of cyanogen by the catalyzed gas-phase oxidation of hydrogen cyanide using oxygen or air as the oxidant.

In recent years cyanogen has evoked considerable commercial interest in view of the many potential uses to which it may be put. Cyanogen is useful as an intermediate in the preparation of organic nitriles and in the preparation of oxamide by acid hydrolysis. Cyanogen is useful as a fuel, as a fumigant, and as a source of nitrogen for the preparation of nitrided steel.

In the past, cyanogen has been prepared by a variety of methods. Among such methods has been the thermal decomposition of cyanide salts, such as cupric cyanide, and the oxidation of hydrogen cyanide using various oxidizing agents. Where strong oxidizing agents have been used, such as manganese dioxide, potassium permanganate, chlorine, etc., undesirable by-products are formed. More recently, a process has been developed for the oxidation of hydrogen cyanide to cyanogen using nitrogen dioxide (or higher nitrogen oxides), either alone or in admixture with oxygen as the oxidizing agent. Such a process is described in Fierce et al. Patent 2,884,308, and in copending patent applications of Fierce et al., representing improvements on the process described in said patent. The oxidation of hydrogen cyanide using nitrogen oxides as the oxidizing agent, either with or without a catalyst, has presented problems of separation of cyanogen from the reaction products and unreacted hydrogen cyanide and nitrogen oxides, and has presented difficult problems in relation to the recovery of unreacted materials for recycle.

It is therefore apparent that a process using air or oxygen as an oxidizing agent for converting hydrogen cyanide to cyanogen would be advantageous if cyanogen could be obtained in good yield over extended periods of time. It is known that if a mixture of air or oxygen and hydrogen cyanide is contacted with certain catalysts at relatively high temperatures, cyanogen can be obtained in moderately good yields. In Moje Patent 2,712,493, a process is described in which hydrogen cyanide is oxidized by air or oxygen at temperatures of about 300°–600° C., using a silver catalyst. This patent, however, describes a process in which good yields are obtained only at the upper levels of temperature. Eubanks Patents 2,955,021, and 2,955,022, processes are described in which hydrogen cyanide is oxidized with air or oxygen using a cobalt or a copper oxide catalyst. This process appears to be extremely sensitive to temperature and is operative only in the narrow temperature range from about 125°–175° C. Under these conditions only moderately small yields of cyanogen are obtained. In the oxidation of hydrogen cyanide using oxygen or other oxidizing agents, with or without catalysts, the reaction conditions are generally critical, particularly when very active catalysts are used, and there is a tendency for the oxidation to go beyond the point at which cyanogen is formed and completely consume the hydrogen cyanide with the result that nitrogen, carbon dioxide, and water are the products.

It is therefore one object of this invention to provide a new and improved process for the production of cyanogen by partial oxidation of hydrogen cyanide.

Another object of this invention is to provide an improved process for oxidation of hydrogen cyanide to cyanogen using air or oxygen as the oxidizing agent.

A feature of this invention is the provision of an improved process for the oxidation of hydrogen cyanide to cyanogen, using air or oxygen as the oxidizing agent, in the presence of a catalyst consisting of a high-surface-area (in excess of 75 m.$^2$/g.) refractory oxide (or mixture of refractory oxides) having chemically combined therewith a promoter selected from the group consisting of metals of groups I and II of the periodic table, chromium, molybdenum, manganese, iron, and nickel, preferably at a metal content of about 0.5–15.0% wt.

Other objects and features of this invention will become apparent from time to time throughout the specification and claims as hereinafter related.

This invention is based upon our discovery that hydrogen cyanide can be partially oxidized by oxygen (or air or other mixtures of inert gases with oxygen) to yield cyanogen in substantially higher yields and selectivities, and at lower temperatures, by utilizing an oxidation catalyst prepared by incorporating a metal oxide, hydroxide, or decomposable salt (e.g. nitrate, acetate, oxalate, carbonate, etc.) on a refractory oxide or mixed oxide support, such as silica, silica-alumina, alumina, etc., having a surface area greater than about 75 m.$^2$/g., followed by calcination of the catalyst composite to cause the metal compound to react chemically with the support. In the previous work of Fierce et al., mentioned above, various catalysts were used for promoting the partial oxidation of hydrogen cyanide by nitrogen oxides to yield cyanogen. Catalysts which were used consisted mainly of alkali metal oxides or halides, or alkaline earth metal oxides or halides, on various supports. Supports which have been used include pumice, kieselguhr, alumina, etc. The surface areas of such supports have ranged from about 0.5 to 60 m.$^2$/g. One of the earlier catalysts investigated consisted of magnesium oxide on pumice having a surface area of about 0.5 m.$^2$/g. This catalyst was used in the oxidation of hydrogen cyanide by nitrogen dioxide at a temperature of about 270°–290° C. Under these conditions, good yields of cyanogen were obtained, but the catalyst was found to be susceptible to deterioration both in activity and selectivity, presumably because of interaction of acidic components of the charge reactants, or of the reaction products, with metal promoter on the catalyst. Also, the cyanogen formed in the reaction was difficult to separate in pure form from the unreacted charge material and by-products.

We have found that the catalyzed oxidation of hydrogen cyanide to cyanogen using air or oxygen as the oxidant will produce cyanogen in high yields and selectivities over an extended period of time if a catalyst is used which has a high surface area and in which the oxidation promoter is chemically combined with the catalyst support. In preparing catalysts for use in accordance with this invention, we prefer to utilize gel-type refractory oxides or mixed oxides, having a surface area greater than 75 m.$^2$/g., which have not previously been calcined above about 370° C., and which still have incorporated within their structures an amount of water in excess of about 5% wt. Alternatively, we can utilize the undried hydrogels of these materials, which, as slurries or filter cakes, contain up to 85% wt. water or more. The refractory support materials which are used as high-surface-area refractory oxides having B.E.T. surface areas in excess of about 75 m.$^2$/g. Refractory materials which have these properties include silica gel, activated alumina, and refractory mixed oxide gels, such as silica-alumina, silica-magnesia, silica-zirconia, silica-titania silica-boria, etc. In the preparation of the catalysts used in our process, a gel (which may have been dried to a water content not less than about 5% wt.) is mixed intimately with a metal promoter which is an oxide, hydroxide, or decomposable salt of metals of groups I and II of the periodic table, or of chromium, molybdenum, manganese, iron or nickel. The intimate association of the promoter metal oxide, hydroxide or salt, can be accomplished by any of the known methods of forming catalyst composites. However, we prefer to (1) slurry the gel into an aqueous solution containing the requisite amount of a water-soluble salt of the selected metal: (2) add ammonia or other base to the slurry to precipitate the hydroxide or oxide of the metal: and (3) filter the slurry to recover the composite catalyst material. The catalyst composite which is thus prepared is then calcined at a temperature of 260°–540° C. for a time sufficient to effect completion of reaction between the metal compound and the surface oxide or hydroxide groups in the refractory support. The catalyst which is thus produced is one in which the metal is chemically combined to the support through an oxide linkage. The final catalyst composition which is prepared in this manner contains the combined metal at a concentration of about 0.5 to 15% wt. The catalyst which is thus prepared is used in the oxidation of hydrogen cyanide by air or oxygen (or other mixtures of oxygen with inert gases) at a temperature of about 40–400° C., and is effective to produce cyanogen in high yields and selectivities over extended periods of operation.

In our process, the reactor or reaction vessel can be constructed of any suitable material of construction which is resistant to the reactants and to the conditions of temperature and pressure used in the reaction. Thus, the reactor can be of quartz, glass, stainless steel, ceramic, etc. In carrying out this process, the reactants are contacted with the catalysts at a temperature of about 40–400° C., preferably about 150°–290° C. The space velocity of reactants is not critical and may vary over wide limits. The gaseous hourly space velocity, i.e., volume of gas charged per unit volume of catalyst per hour, may vary from 50 to 2000 or higher, although space velocities of the order of 300–700 are preferred. Hydrogen cyanide and the oxygen-containing gas (oxygen, air, or mixtures of oxygen with other inert gases, such as helium) are fed through the reactor at a hydrogen cyanide/oxygen mol ratio in the range of 1.0/0.25–10, preferably about 1.0/1–4. In this process, the use of a stoichiometric excess of oxygen is preferred since an excess of oxygen appears to prevent deactivation of the catalyst over extended periods of operation. The cyanogen may be separated from the reaction mixture in any known manner, e.g., fractional condensation, absorption or adsorption, extraction, etc. A preferred manner of separation of products is by fractional condensation wherein the hydrogen cyanide is first condensed from the effluent gases at about 25° C., and cyanogen then separated from the remaining gases in a trap maintained at a temperature less than about −21° C. (the boiling point of cyanogen). This separation can be carried out using a conventional series of low-temperature fractionating columns if desired.

The following non-limiting examples are illustrative of the scope of this invention.

*Example I*

A 223-g. portion of alumina gel (having a potential surface area of about 200 m.$^2$/g.) which had been dried for 24 hours at 100° C. (to a water content of about 10%) was slurried into 360 ml. of an aqueous solution containing 53.8 g. of magnesium nitrate hexahydrate. To this slurry, 180 ml. of aqueous solution containing 31.1 ml. of 28% ammonium hydroxide were added, with agitation, and the agitation was continued for 0.5 hour. Then the slurry was filtered and the filter cake was dried overnight at 110° C. The dried filter cake was calcined for 6 hours at 400° C., which was sufficient to effect a chemical interaction between the magnesium oxide and the surface hydroxyl groups in the alumina gel. The resulting catalyst was mixed with 1% wt. graphite and formed into ⅛-inch pellets. The catalyst pellets were treated by heating for about 21 hours at 400° C., under a small flow of nitrogen to insure completion of reaction between the magnesium oxide and the catalyst support.

This catalyst was then evaluated in the oxidation of hydrogen cyanide to cyanogen using oxygen as the oxidant. In this experiment, a mixture of hydrogen cyanide and oxygen in a 1.0/1.1 mol ratio was fed through a glass-tube reactor maintained at a temperature of about 224° C. The hydrogen cyanide was fed at a space velocity of 262 and the oxygen at a space velocity of 294. Under these reaction conditions, hydrogen cyanide was converted to the extent of 32.5%. Cyanogen was obtained in a yield of 30.4% and a selectivity of 93.5%.

*Example II*

A 223-g. portion of alumina gel, as used in Example I, is slurried into 360 ml. of an aqueous solution containing 35.7 g. silver nitrate. To this slurry, 180 ml. of an aqueous solution containing 13.5 g. of ammonium chloride is added, with agitation. Agitation is continued for 0.5 hour after addition is completed. The slurry is filtered and the filter cake washed with three separate 250-ml. portions of distilled water. The wet filter cake is dried overnight at 110° C., and the dried cake calcined for 6 hours at about 400° C. The resulting catalyst is mixed with 1% graphite and formed into ⅛-inch pellets. The catalyst pellets are pretreated by heating for about 21 hours at about 400° C. under a slow flow of nitrogen. The preliminary heating of the catalyst and the pretreatment of the catalyst pellets is effective to cause a chemical interaction between the silver oxide which is formed and the hydroxyl groups on the surface of the alumina gel. As a result the silver is combined with the catalyst support through an oxide linkage. When the catalyst which is thus prepared is used in the oxidation of hydrogen cyanide with an equal molar portion of oxygen at a temperature of about 200° C. and gaseous hourly space velocity of charge gases of about 600, a substantial yield of cyanogen is obtained.

*Example III*

A catalyst is prepared by impregnating a silica-alumina gel (87% silica/13% alumina) with lithium hydroxide and calcining same as in Example I. When a mixture of hydrogen cyanide and air, in a hydrogen cyanide/oxygen mol ratio of 1:4, is passed over this catalyst at a temperature of 175° C. and a total charge gaseous hourly space velocity of 500, a substantial yield of cyanogen is obtained.

*Example IV*

A catalyst is prepared by impregnating silica-zirconia with an aqueous solution of ammonium molybdate. When this catalyst is calcined as in Example I, the molybdenum oxide which is formed is chemically bound to the catalyst support through oxide linkages. This catalyst is effective in oxidizing hydrogen cyanide with air or oxygen at temperatures in a range from about 100° to 400° C.

*Example V*

A catalyst is prepared by impregnating silica gel with an aqueous solution of manganese nitrate. This catalyst is dried and then calcined as in Examples I and II to effect a chemical bond between the manganese dioxide and the surface hydroxyl groups of the silica gel. The catalyst which is prepared in this manner is effective in catalyzing the oxidation of hydrogen cyanide to cyanogen using air or oxygen as the oxidant, as described in Examples I and II.

Example VI

A silica-boria gel is impregnated with an ammonium hydroxide solution of nickel (III) hydroxide and dried to disperse nickel oxide throughout the gel. This catalyst is calcined as in Examples I and II to effect a chemical bond between the nickel and the catalyst support. When this catalyst is used in the oxidation of hydrogen cyanide with air or oxygen, using a stoichiometric excess of air, at a temperature of about 250° C., excellent yields of cyanogen are obtained.

Example VII

In order to demonstrate the superior activity of the catalysts of this invention over the catalysts in which a low-surface-area support was used, a catalyst was prepared by impregnating 450 g. of 8–16 Italian pumice (surface area 0.5 m.$^2$/g.) with 250 ml. of an aqueous solution containing 107.0 g. of magnesium chloride hexahydrate. The wet catalyst mixture was dried overnight at 110° C., and then calcined for one hour successively at 204° C., 260° C., 316° C., 371° C., and 427° C., and for three hours at 538° C. This catalyst was evaluated in an oxidation of hydrogen cyanide utilizing a mixture of nitric oxide and oxygen as the oxidant. Reaction was carried out at about 275°–285° C. at atmospheric pressure. The hydrogen cyanide was introduced using helium as carrier gas at a hydrogen cyanide space velocity of 27. In the reaction, a hydrogen cyanide-nitric oxide-oxygen ratio of 2.0/1.0/8.6 was used. Under these conditions, hydrogen cyanide was consumed to the extent of 67.8% and cyanogen was obtained in a yield of 53.2% and selectivity of 78.5%.

When this catalyst was used in the oxidation of hydrogen cyanide using oxygen alone as the oxidant, substantially different results were obtained. Hydrogen cyanide was fed at a gaseous hourly space velocity of about 150 (total gaseous hourly space velocity was 566) in admixture with oxygen and nitrogen, at a hydrogen cyanide/oxygen mol ratio of 4.2. The mixture of hydrogen cyanide, nitrogen and oxygen was passed over the catalyst at a temperature of about 210°–220° C. Under these conditions, hydrogen cyanide was converted to the extent of about 4.2% and no significant amount of cyanogen was formed.

From the foregoing examples, we have established that hydrogen cyanide can be oxidized to cyanogen at high yield and high selectivity without deterioration of catalyst activity on extended use, using oxygen alone, or in admixture with inert gases, such as nitrogen, helium, etc., as the oxidant, by utilizing a catalyst having a high surface area (in excess of about 75 m.$^2$/g.) in which a promoter metal is chemically combined with the catalyst support through an oxide linkage. When catalysts are prepared in this manner, using other high-surface-area, refractory oxide supports, e.g., activated alumina, silica gel, silica-alumina, silica-zirconia, silica-titania, silica-boria, etc., catalysts are obtained which have a very high catalytic activity and selectivity for formation of cyanogen from hydrogen cyanide. In the preparation of these catalysts, an oxide, hydroxide, or decomposable salt of a metal of group I or group II of the periodic table or of chromium, molybdenum, manganese, iron or nickel is deposited in intimate contact with the refractory oxide support, and calcined at a temperature of about 260°–540° C. for a time sufficient to effect completion of reaction between the impregnant and the support. In preparing the catalyst, the refractory oxide support is preferably mixed with an aqueous solution of a salt of any of the aforementioned metals and converted to the oxide or hydroxide form by treatment with ammonium hydroxide. The refractory support with the metal oxide or hydroxide precipitated therein is subsequently calcined to effect a chemical reaction with the surface hydroxyl groups in the support.

This catalyst can then be used in the oxidation of hydrogen cyanide using oxygen as the sole oxidant, at temperatures of about 40°–400° C., preferably about 150°–285° C. The reaction is carried out normally at atmospheric pressure, although subatmospheric or superatmospheric pressures may be used as desired. The space velocity of reactants may vary widely and is not critical. The activity and selectivity of this catalyst for formation of cyanogen remains high over extended periods of operation, especially when a stoichiometric excess of oxygen is used in the process.

While we have described our invention fully and completely with special emphasis upon several preferred embodiments, we wish it to be understood that within the scope of the appended claims, this invention may be practiced otherwise than as described herein.

The embodiments of the invention in which an exclusive property or privilege is claimed as follows:

1. A process for the preparation of cyanogen which comprises passing a mixture of hydrogen cyanide and oxygen, containing no other oxidizing agent, at a temperature of about 40°–400° C., sufficient to induce reaction between the oxygen and hydrogen cyanide, over a catalyst prepared by impregnating a refractory oxide support having a B.E.T. surface area in excess of about 75 m.$^2$/g., and a water content in excess of about 5% wt. with a compound selected from the group consisting of nitrates, acetates, oxalates and carbonates, oxides, and hydroxides of metals of groups I and II of the periodic table, chromium, molybdenum, manganese, iron, and nickel, to a metal content of about 0.5–15.0% wt., and calcining the catalyst at 260°–540° C. for a time sufficient to effect completion of reaction between the impregnant and the support.

2. A method in accordance with claim 1 in which the support is selected from the group consisting of silica gel, alumina, and refractory mixed oxides gels.

3. A method in accordance with claim 1 in which the reaction is carried out at a HCN/O$_2$ mol ratio of 1:0.25 to 1:10.

4. A method in accordance with claim 1 in which the gaseous hourly space velocity of reactants is in the range of about 50–2000.

5. A method in accordance with claim 1 in which the reactants are fed in admixture with an inert diluent.

6. A method in accordance with claim 1 in which the catalyst impregnant is magnesium hydroxide.

7. A method in accordance with claim 1 in which the catalyst impregnant is lithium hydroxide.

8. A method in accordance with claim 1 in which the catalyst impregnant is molybdenum oxide.

9. A method in accordance with claim 1 in which the catalyst impregnant is manganese dioxide.

10. A method in accordance with claim 1 in which the catalyst impregnant is nickel (III) oxide.

11. A method in accordance with claim 1 in which the catalyst impregnant is silver oxide.

12. A process for the preparation of cyanogen which comprises passing hydrogen cyanide and oxygen in a mol ratio of 1:0.25 to 1:10 at a temperature of about 150°–300° C., sufficient to effect reaction between oxygen and hydrogen cyanide, over a catalyst prepared by mixing an alumina with an aqueous solution of a magnesium compound, precipitating magnesium hydroxide in the alumina gel, and calcining the impregnated catalyst at about 400° C. until reaction between the impregnant and support is complete.

References Cited in the file of this patent

UNITED STATES PATENTS

| | | |
|---|---|---|
| 2,712,493 | Moje | July 5, 1955 |
| 2,955,021 | Eubanks | Oct. 4, 1960 |